No. 828,075. PATENTED AUG. 7, 1906.
W. L. TUCKER.
CULTIVATOR.
APPLICATION FILED AUG. 12, 1905.
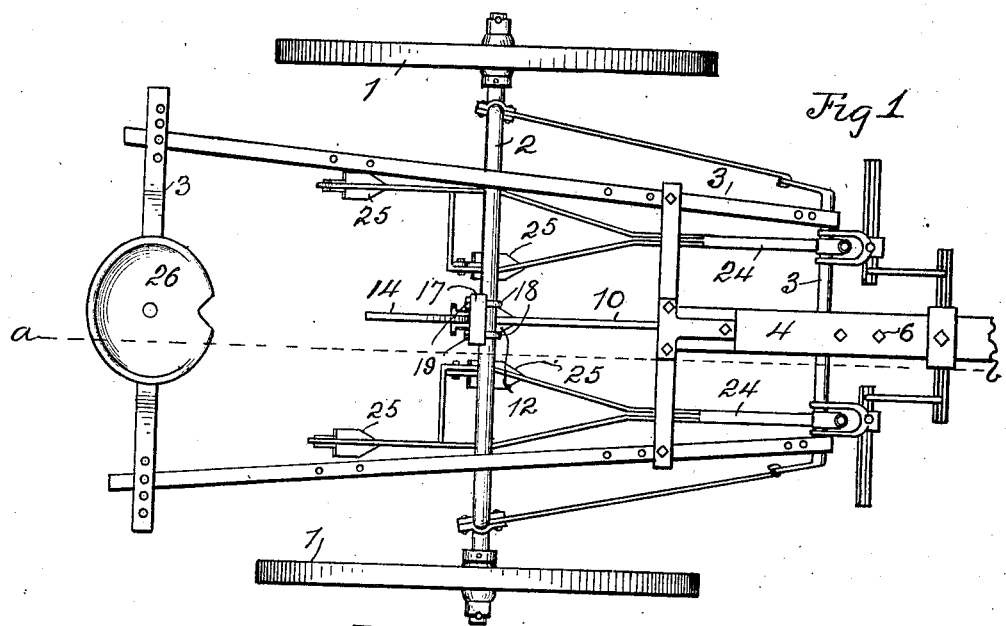
Fig 1
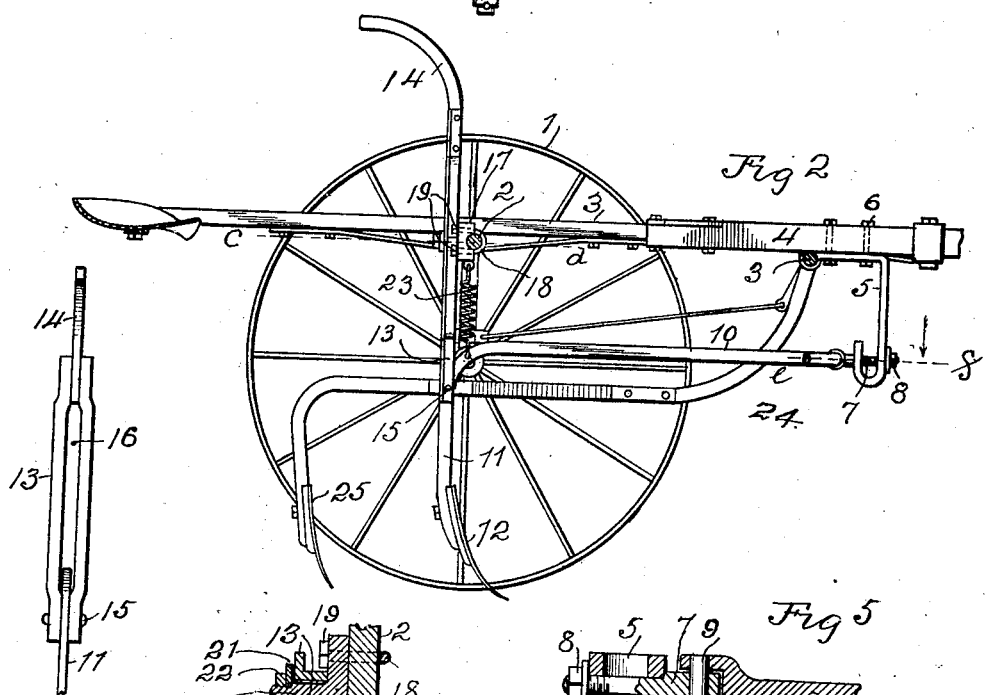
Fig 2
Fig 3
Fig 4
Fig 5
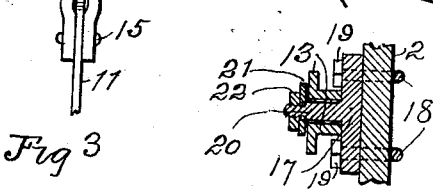
Witnesses
R. E. Hamilton
H. W. House
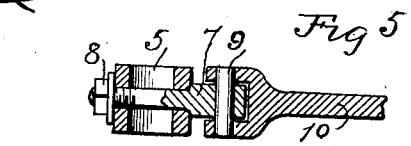
Inventor
W. L. Tucker
By Warren D. House
His Attorney

UNITED STATES PATENT OFFICE.

WILLIAM L. TUCKER, OF BRIDGEPORT, OKLAHOMA TERRITORY.

CULTIVATOR.

No. 828,075.     Specification of Letters Patent.     Patented Aug. 7, 1906.

Application filed August 12, 1905. Serial No. 273,975.

*To all whom it may concern:*

Be it known that I, WILLIAM L. TUCKER, a citizen of the United States, residing at Bridgeport, in the county of Caddo and Territory of Oklahoma, have invented new and useful Improvements in Cultivators, of which the following is a specification.

My invention relates to improvements in cultivators used for cultivating corn, cotton, or other plants which are grown in rows.

The object of my invention is to provide, in connection with an ordinary cultivator, an auxiliary cultivating or chopping device for thinning out the plants in a row or for cutting weeds from between the hills during the operation of cultivating.

The novel features of my invention are hereinafter fully described and claimed.

In the accompanying drawings, Figure 1 is a plan view of a cultivator of the ordinary type provided with the chopping mechanism of my invention. Fig. 2 is a longitudinal vertical section taken on the dotted line *a b* of Fig. 1. Fig. 3 is a rear elevation view of the upper end of the operating-lever. Fig. 4 is a horizontal sectional view taken on the dotted line *c d* of Fig. 2. Fig. 5 is a horizontal sectional view taken on the dotted line *e f* of Fig. 2.

Similar characters of reference denote similar parts.

1 denotes the carrying-wheels of an ordinary cultivator, the frame of which is provided with an axle 2, on which the wheels 1 are rotatively mounted, the frame being provided with a horizontal body portion 3, provided with a tongue 4, to the lower side of which is secured the upper end of a bracket 5, preferably rotatable upon a vertical bolt 6, which extends through the bracket and tongue. The lower end of the bracket 5 is preferably U-shaped, the two arms of which are provided with holes, in which is rotatively mounted a longitudinal horizontal bolt 7, the forward end of which is screw-threaded and has mounted upon it a nut 8, which has a bearing upon the forward side of the bracket 5. The rear end of the bolt 7 is provided with a transverse hole, in which is mounted a horizontal pin 9, upon the ends of which is pivoted, so as to swing vertically thereon, the forward end of the horizontal longitudinal arm 10 of a chopper-beam, the rear end of which is provided with a downwardly-extending arm 11, having secured to its lower end a shovel or blade 12. An operating-lever 13, provided at its upper end with a handle 14, is secured at its lower end pivotally to a horizontal transverse bolt 15 to the arm 11. The operating-lever 13 is provided with a longitudinal slot 16, in which is mounted a fulcrum device carried by the frame and upon which the lever is vertically movable and pivoted to swing laterally, so as to swing the chopper-beam carrying the shovel 12 laterally to and fro.

The fulcrum device comprises, preferably, the following parts: A plate 17 is mounted upon the rear side of the axle 2, to which it is secured by means of two U-bolts 18, which embrace the axle 2 and extend through horizontal holes provided therefor in the plate 17, the rear threaded ends of the U-bolts 18 having mounted thereon the nuts 19, which bear upon the rear side of the plate 17. The plate 17 is provided with a horizontal stud 20, which extends through the slot 16 of the lever 13. The rear end of the stud 20 to the rear of the lever 13 is shouldered and screw-threaded and has mounted on it to the rear of the lever 13 a washer 21, adapted to bear against the rear side of the lever and retained on the stud by means of a nut 22, mounted on the screw-threaded end of the said stud. The lever 13 is movable upward and downward on the stud 20 and may be swung laterally to and fro thereupon. For supporting the rear end of the chopper-beam a coil-spring 23 is provided, the lower end of which is secured to the said beam and the upper end of which is secured to the plate 17. 24 denotes the ordinary beams carrying at their rear ends the cultivator-shovels 25, respectively, the forward ends being hinged to the frame 3. The chopper-beam is located intermediate the beams 24, so that when the shovels 25 are disposed respectively upon opposite sides of the row the chopper-beam and shovel 12, carried thereby, may be swung transversely across the row for the purpose of thinning out the corner-cotton or for cutting out weeds growing in the row.

In operating my invention the driver occupying the seat 26, carried by the horizontal portion of the frame 3, manipulates the beams 24 in the ordinary manner for the purpose of cultivation. To cut out any plants growing in the row, the driver grasps the handle 14 and at the proper time swings the same laterally so as to direct the shovel 12 to the proper position to effect the purpose. The tension of the spring 23 may be such that the shovel 12 will be held clear of the ground excepting at such times as it is desired to operate the lever 13, at which times the driver forces the lever 13 downwardly until the shovel 12 enters the soil. If desired, the tension of the spring 23 may be such as to permit the shovel 12 to normally enter the ground to a certain depth instead of retaining the shovel normally above the ground.

My invention may be modified in many ways without departing from its spirit.

Having thus described my invention, what I claim, and desire to secure by Letters Patent, is—

1. The combination with the cultivator-frame, of the chopper-beam, a coupling between the beam and frame by means of which the beam may be swung vertically and laterally, and an operating-lever vertically slidable on the cultivator-frame and pivoted thereto so as to be swung laterally and also pivoted to the chopper-beam.

2. The combination with the cultivator-frame, of the chopper-beam, a coupling between the beam and frame by means of which the beam may be swung vertically and laterally, a vertically-slidable operating-lever pivoted to the beam and to the frame so as to be swung laterally on the frame, and a spring for normally swinging the beam upwardly.

3. The combination with the cultivator-frame, of the chopper-beam pivoted to the frame so as to swing vertically and laterally, a fulcrum device mounted on the frame, and an operating-lever having a longitudinal slot in which the fulcrum device is slidable, the lever being pivotally mounted on the fulcrum so as to swing laterally and also pivoted to the chopper-beam.

4. The combination with the cultivator-frame, of the chopper-beam pivoted thereto so as to swing vertically and laterally, the longitudinally-slotted operating-lever pivoted to the beam, a fulcrum device carried by the frame and mounted in the slotted portion of the lever and upon which the lever is pivoted to swing laterally, and a spring for normally swinging the beam upwardly on the frame.

5. The combination with the cultivator-frame, of the chopper-beam having a horizontal portion and a downwardly-extending portion provided with a chopper-shovel, a coupling supported by the frame and pivoted to the horizontal portion of the beam so as to permit vertical swinging and oscillation of the beam around a longitudinal, horizontal axis, and a lever slidable vertically upon the frame to which it is pivoted to swing laterally, the lever being pivoted to the downwardly-extending portion of the beam.

6. The combination with the cultivator-frame having the axle, of the chopper-beam pivoted to the frame so as to oscillate laterally and swing vertically, the operating-lever pivoted to the chopper-beam, and a fulcrum device mounted on the axle and having the operating-lever vertically slidable thereon and pivoted thereto so as to swing laterally.

In testimony whereof I affix my signature in presence of two subscribing witnesses.

WILLIAM L. TUCKER.

Witnesses:
J. C. RODGERS,
JAS. BOYD.